No. 799,640. PATENTED SEPT. 19, 1905.
H. H. EDGERLE.
COW POKE.
APPLICATION FILED OCT. 18, 1904.
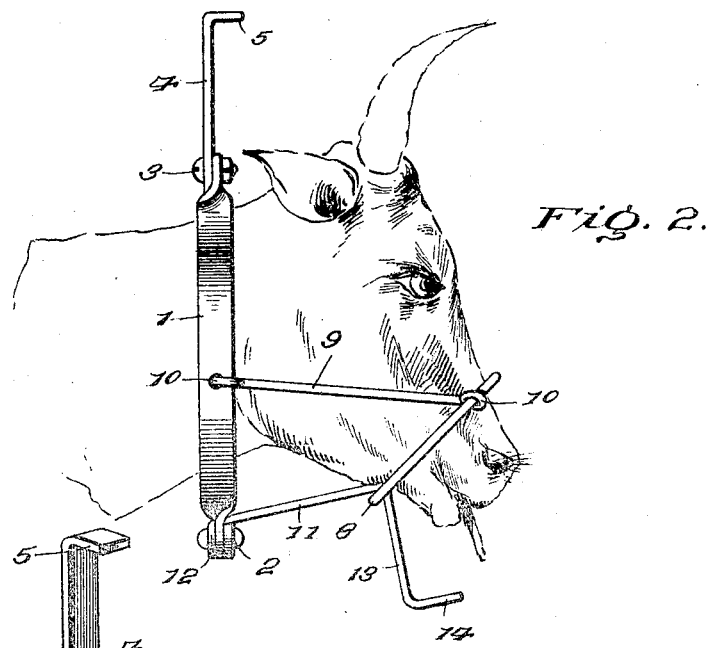
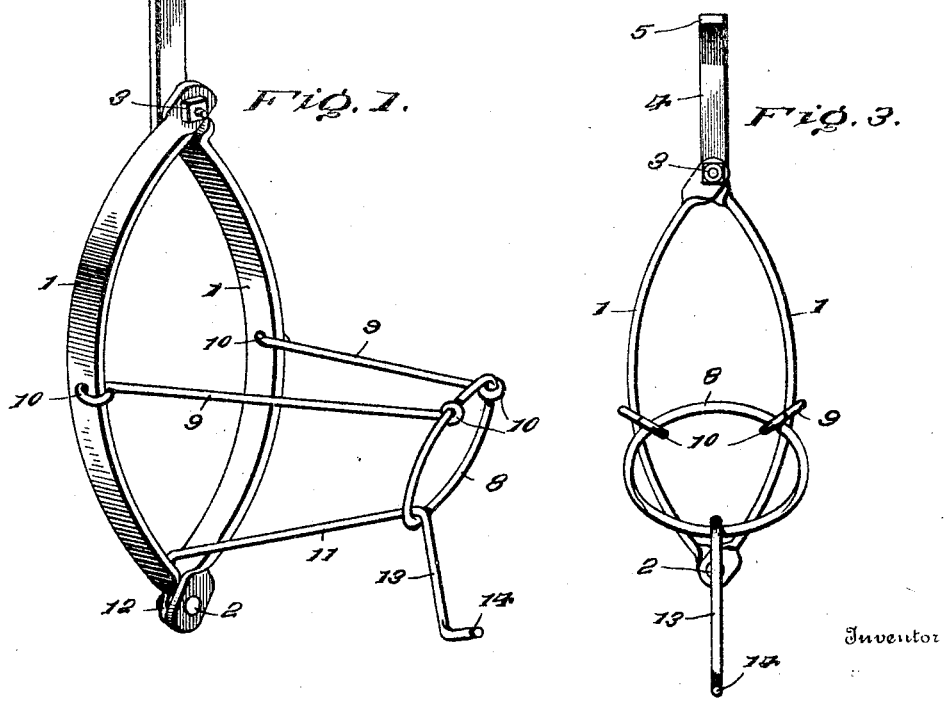
Witnesses
Inventor
Harrison H. Edgerle
By
R.S.&A.B.Lacey, Attorneys

UNITED STATES PATENT OFFICE.

HARRISON H. EDGERLE, OF CHERRYVALE, KANSAS.

COW-POKE.

No. 799,640.　　　　Specification of Letters Patent.　　　　Patented Sept. 19, 1905.

Application filed October 18, 1904. Serial No. 228,972.

*To all whom it may concern:*

Be it known that I, HARRISON H. EDGERLE, a citizen of the United States, residing at Cherryvale, in the county of Montgomery and State of Kansas, have invented certain new and useful Improvements in Cow-Pokes, of which the following is a specification.

This invention embodies a device for preventing animals from breaching or jumping over wire or like fences, and is specifically designed for use on cattle.

The device or "poke," as same is commonly styled, is of the type which consists, primarily, of a yoke of peculiar form, by which it is secured to the animal, and upwardly and downwardly projecting arms utilized to retard the animal in attempting to pass the fence by engagement with the latter.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of the animal-poke embodying the invention. Fig. 2 is a side elevation, the head of the animal to which the poke is shown applied being illustrated in dotted lines. Fig. 3 is a front elevation of the device.

As before mentioned, the invention comprises a yoke. This yoke consists of curved side bars 1, adapted to embrace the neck of the animal upon opposite sides and to be secured in this position. The bars 1 are pivoted together at their lower extremities, as shown at 2, being secured at the upper portions thereof by means of a suitable fastening 3 in the form of a bolt or the like. One of the bars 1 is extended upwardly beyond the extremity of the other bar to form an arm 4, which projecting upwardly from the body of the animal is adapted to engage the fence should that animal attempt to break therethrough. The projection 5 extends forwardly from the arm 4 of the yoke and facilitates engagement of the fence-wire or like part with this member at the same time obviating the likelihood of disengagement of the part 4 by the animal in his endeavors to forcibly break through the fence.

Connected with the yoke above described is an engaging member or ring 8, adapted to fit about the nose of the animal, said ring being attached to the yoke by means of links 9 or similar members, which rest upon opposite sides of the head of the animal when the device is in use. The links 9 are formed with eyes 10 at opposite extremities, said eyes receiving, respectively, side members of the ring at one end and engaging the side bars 1 of the yoke at the other end. The side bars 1 are provided with openings at points about intermediate the ends thereof, so as to receive the eyes 10 of the adjacent link or connecting members 9. A lower fence-engaging member is likewise provided, and this member consists of a bar 11, bent downwardly at its rear end, as shown at 12, and attached by the pivot member 2 to the yoke at this point. The bar 11 is provided with a downwardly-extended arm 13 at its forward end, and a projection 14 is formed at the lower extremity of the arm 13 by bending this arm forward for a short distance.

The bar 11 passes through the ring 8 approximately at the point where the arm 13 extends from said bar, so that when the arm 13 engages the fence a downward pressure will be exerted upon the ring 8 and such pressure will deter the animal in his attempts to breach the fence or jump thereover. The arm 4 of the yoke contacts with the fence only when the cow attempts to break therethrough.

The invention, as hereinbefore set forth, is very simple in structure and may be very cheaply manufactured, and the device is very advantageous in that when in use same is not likely to hurt the animal, though being very efficacious for the purposes for which same is used.

Having thus described the invention, what is claimed as new is—

1. In a device of the class described, the combination of a yoke having an arm extending upwardly therefrom, a ring, members connecting the ring with the yoke, and a bar projected forwardly from the yoke into engagement with the ring and extended downwardly to form an arm.

2. In a device of the class described, the combination of a yoke, an arm extended upwardly from the yoke, a ring spaced from the yoke, links connecting the ring with the sides of the yoke, a bar connected at its rear end with the lower portion of the yoke and extended forwardly therefrom through the ring aforesaid, and an arm projected downwardly from the forward portion of the bar.

3. In a device of the class described, the combination of a yoke comprising curved side bars pivoted together at their lower ends and attached at their upper end portions, one of said arms being extended upwardly from the upper point of attachment to form an arm, a projection extended forwardly from the upper extremity of said arm, a ring spaced from the yoke, links connecting said ring with the side bars of the yoke at a point intermediate the curved portions of the latter, a bar secured at its rear end to the pivot attaching the lower extremities of the yoke-bars and extended forwardly through the ring, and an arm projecting downwardly from the forward portion of the bar aforesaid and extended forwardly to form a projection.

In testimony whereof I affix my signature in presence of two witnesses.

HARRISON H. EDGERLE. [L. S.]

Witnesses:
H. C. PITTENGER,
C. A. MITCHELL.